United States Patent [19]

Weingarten

[11] Patent Number: 4,496,132
[45] Date of Patent: Jan. 29, 1985

[54] SLEEVE VALVE WITH INTEGRAL CONTROL CHAMBER

[76] Inventor: Zvi Weingarten, Kibbutz Evron, Mobil Post Ashrat, Israel

[21] Appl. No.: 446,183

[22] Filed: Dec. 2, 1982

Related U.S. Application Data

[63] Continuation of Ser. No. 296,919, Aug. 27, 1981, abandoned.

[51] Int. Cl.³ .............................................. F16K 31/385
[52] U.S. Cl. ........................................ 251/5; 251/61.1
[58] Field of Search .................. 251/61, 5, 61.1, 843; 222/504, 544; 239/537, 546

[56] References Cited

U.S. PATENT DOCUMENTS

| | | | |
|---|---|---|---|
| 2,998,198 | 8/1961 | Young | 251/5 |
| 3,301,443 | 1/1967 | Clancy et al. | 137/852 |
| 3,685,538 | 8/1972 | Sullivan | 251/5 |
| 3,690,344 | 9/1972 | Brumm | 251/5 |
| 3,936,028 | 2/1976 | Norton et al. | 251/5 |

FOREIGN PATENT DOCUMENTS

| | | | |
|---|---|---|---|
| 1125243 | 3/1962 | Fed. Rep. of Germany . | |
| 56-90167 | 7/1981 | Japan . | |
| 70002 | 12/1951 | Netherlands | 251/5 |
| 634975 | 3/1950 | United Kingdom | 251/4 |
| 689229 | 3/1953 | United Kingdom | 251/5 |

*Primary Examiner*—Martin P. Schwadron
*Assistant Examiner*—Sheri Novack
*Attorney, Agent, or Firm*—Silverman, Cass & Singer, Ltd.

[57] ABSTRACT

A sleeve valve comprising an elastomer sleeve folded onto itself, the two peripheral ends being fixedly held so that an integral control chamber is created, an opening being provided in said chamber for connecting it to a control pressure source, no housing being required.

4 Claims, 4 Drawing Figures

SLEEVE VALVE WITH INTEGRAL CONTROL CHAMBER

This application is a continuation of application Ser. No. 296,919, filed Aug. 27, 1981, now abandoned.

The present invention concerns a sleeve valve with integral control chamber.

Sleeve valves are known, comprising an elastomer sleeve generally mounted in a housing, the sleeve being surrounded by a pressure chamber to keep it in closed or pinched condition.

It is the object of the present invention to provide a sleeve valve wherein the sleeve has an integral control chamber so that the housing for the valve can be eliminated.

It is a further object of the invention to provide a sleeve valve which owing to its construction is cheap, is efficient in operation and assures a long service life without requiring maintenance or replacement.

The invention consists in a sleeve valve comprising an elastomer sleeve folded onto itself, the two peripheral ends being fixedly held so that an integral control chamber is created, an opening being provided in said chamber for connecting it to a control pressure source.

The part of said sleeve which, when it is folded, comes to lie on the inside is constructed to have the characteristics of a conventional sleeve valve, while the part which comes to be on the outside constitutes a retaining wall, so that the housing can be eliminated.

The invention is illustrated, by way of example only, in the accompanying drawings in which.

Figure 1:
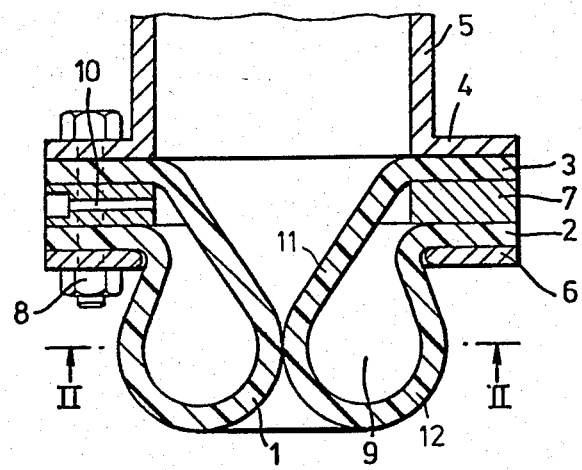
FIG. 1 is a longitudinal section through a sleeve valve with integral control chamber according to the invention installed at the end of a pipe line.
Figure 2:
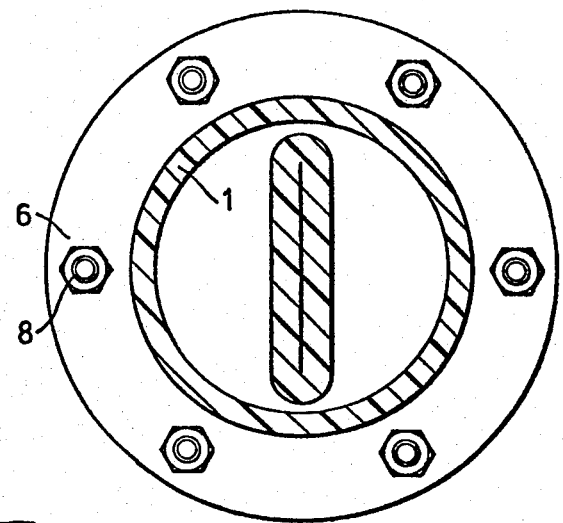
FIG. 2 is a section thereof taken on line II—II of FIG. 1.

The sleeve valve according to the invention comprises an elastomer sleeve 1 which is folded onto itself, its two peripheral edges 2 and 3 being held between a flange 4 at the end of a pipe line 5 and an annular retaining ring 6. A second annular ring 7 is inserted between ends 2 and 3, the entire assembly being fastened to flange 4 by means of bolts and nuts 8.

It can be seen from FIG. 1 that when sleeve 1 is folded into itself and its ends are retained, a peripheral chamber 9 is formed which becomes the control chamber of the sleeve valve in that an opening 10 is provided in ring 7, said opening being connected to a control pressure source (not shown). The part 11 of the sleeve which comes to lie on the inside has the characteristics of a conventional sleeve valve, which when in the closed condition forms with its diametrically opposed side a tight closure. The part 12 thereof which lies on the outside constitutes the retaining wall for the sleeve valve. Thus the housing for this valve can be eliminated, making this type of valve extremely inexpensive to manufacture.

Figure 3:
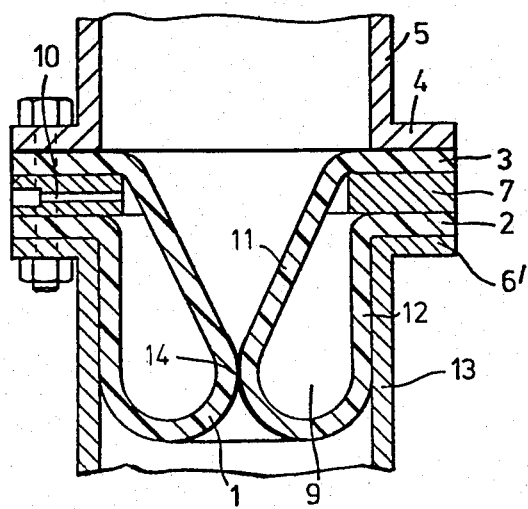
FIG. 3 is a view similar to that of FIG. 1 of a valve according to the invention installed within a pipe line.
Figure 4:
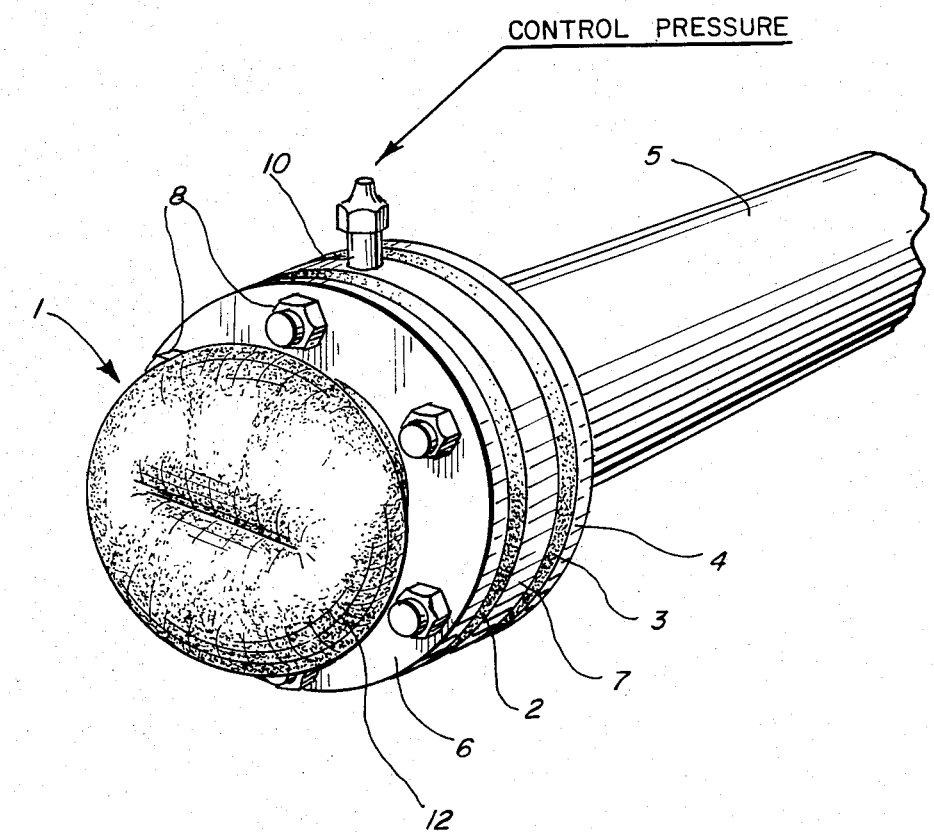
FIG. 4 is a perspective view of the exterior of the sleeve valve installed at the end of a pipe as illustrated in section in FIG. 1.

The valve of FIG. 3 is similar to that of FIG. 1 and the same parts have been designated with the same reference numerals, except that ring 6 here is constituted by a flange 6' of a pipe 13 illustrating how a valve according to the invention can be inserted into a pipe line.

If desired, ring 7 can be eliminated and the opening to the control pressure source can be made in the sleeve itself at any convenient position. Furthermore, the part 11 of the sleeve may be provided with an itegral projecting bead 14 to enhance the contact surface of the closure.

I claim:

1. A sleeve valve comprising a generally circular elastomer sleeve folded onto itself to define an annulus, the two peripheral ends being fixedly held and sealed with respect to each other to provide an entirely integral, expandable control chamber formed within said annulus, means providing an opening to said chamber for connection to a source of control pressure, portions of the inner wall of the annulus closed together when said chamber is pressurized to seal the valve, said portions closed together at a position including a plane axially spaced downstream from any position between said peripheral ends.

2. A sleeve valve as defined in claim 1 wherein the said inner wall portions are provided with an integral sealing bead.

3. A sleeve valve comprising a generally circular elastomer sleeve folded onto itself to define an annulus and to form an integral, expandable control chamber within said annulus, the two peripheral ends of the sleeve being sealed with respect to each other and being fixedly held in close juxtaposition with an intermediary element which provides means communicating with said annulus providing a connection to a source of control pressure, portions of the inner wall of the annulus closed together when said chamber is pressurized to prevent flow through the valve, said portions closed together at a position including a plane axially spaced downstream from any position between said peripheral ends.

4. A sleeve valve as defined in claim 3 wherein the inner wall portions are provided with an integral sealing bead.

* * * * *